(12) United States Patent
Garcia Alcaraz (10) Patent No.: US 10,077,710 B2
(45) Date of Patent: Sep. 18, 2018

(54) ACTUATOR SHAFT BOOT

(75) Inventor: Alexandre Garcia Alcaraz, Sumare (BR)

(73) Assignee: BorgWarner Inc., Auburn Hills, MI (US)

( * ) Notice: Subject to any disclaimer, the term of this patent is extended or adjusted under 35 U.S.C. 154(b) by 339 days.

(21) Appl. No.: 14/005,350

(22) PCT Filed: Mar. 8, 2012

(86) PCT No.: PCT/US2012/028177
§ 371 (c)(1),
(2), (4) Date: Nov. 20, 2013

(87) PCT Pub. No.: WO2012/128957
PCT Pub. Date: Sep. 27, 2012

(65) Prior Publication Data
US 2014/0174075 A1    Jun. 26, 2014

Related U.S. Application Data

(60) Provisional application No. 61/454,627, filed on Mar. 21, 2011.

(51) Int. Cl.
*F02B 37/18* (2006.01)
*F16J 3/04* (2006.01)
(Continued)

(52) U.S. Cl.
CPC .......... *F02B 37/186* (2013.01); *F01D 17/105* (2013.01); *F02B 39/00* (2013.01);
(Continued)

(58) Field of Classification Search
CPC ...... F01D 17/105; F02B 37/186; F02B 39/00; F16J 3/043; F16J 3/046; F05D 2220/40; F05D 2240/55
See application file for complete search history.

(56) References Cited

U.S. PATENT DOCUMENTS 2,596,178 A * 5/1952 Seeler .................. A61M 16/20
128/204.28
3,028,842 A * 4/1962 Dobrikin ............... B60T 17/085
188/170
(Continued)

FOREIGN PATENT DOCUMENTS

| CN | 1386959 | 12/2002 |
| CN | 101341320 | 1/2009 |

(Continued)

OTHER PUBLICATIONS

Korean Office Action (with English language translation) dated Dec. 5, 2017, in Korean Application No. 10-2013-7026903.

Primary Examiner — Phutthiwat Wongwian
Assistant Examiner — Matthew T Largi
(74) Attorney, Agent, or Firm — Eric L. Doyle; Stephan A. Pendorf; Patent Central LLC (57) ABSTRACT

Wastegated turbochargers all use actuators to manipulate the wastegate valve which controls turbine wheel bypass of exhaust gas energy. The diaphragms in these actuators are susceptible to foreign material damage. This damage is minimized by the addition of a boot around the actuator shaft, preventing ingress of foreign materials and fluids which could be detrimental to actuator life.

13 Claims, 9 Drawing Sheets (51) Int. Cl.
  *F01D 17/10* (2006.01)
  *F02B 39/00* (2006.01)
(52) U.S. Cl.
  CPC ............... *F16J 3/043* (2013.01); *F16J 3/046* (2013.01); *F05D 2220/40* (2013.01); *F05D 2240/55* (2013.01); *F05D 2250/61* (2013.01); *F05D 2260/606* (2013.01); *F05D 2260/607* (2013.01); *F05D 2260/79* (2013.01); *Y02T 10/144* (2013.01)

(56) References Cited

U.S. PATENT DOCUMENTS

| | | | |
|---|---|---|---|
| 4,403,538 A | | 9/1983 | Rise |
| 4,468,928 A | * | 9/1984 | Suzuki ................. F02B 37/186 60/602 |
| 4,622,815 A | * | 11/1986 | Piesche .................. F02B 37/18 137/116.3 |
| 4,656,834 A | * | 4/1987 | Elpern ................. F02B 37/183 251/68 |
| 4,694,717 A | * | 9/1987 | Boots .................. A01G 9/1006 83/222 |
| 4,927,203 A | * | 5/1990 | Mayer ..................... E05B 81/25 292/201 |
| 5,552,647 A | * | 9/1996 | Tinkham .................. H01H 9/16 200/17 R |
| 7,334,799 B2 | * | 2/2008 | O'Hara ................. F01D 11/003 277/361 |
| 2004/0128997 A1 | * | 7/2004 | Parker ..................... F01D 17/14 60/602 |
| 2005/0184480 A1 | * | 8/2005 | Arlt .......................... B62D 3/12 280/89.12 |
| 2006/0131116 A1 | * | 6/2006 | Plantan ................. B60T 17/083 188/153 D |
| 2008/0083325 A1 | * | 4/2008 | Scheckelhoff ........ B60T 17/088 92/63 |

FOREIGN PATENT DOCUMENTS

| | | |
|---|---|---|
| DE | 102009029972 | 12/2010 |
| JP | 56165722 | 12/1981 |
| JP | 57139262 U | 8/1982 |
| JP | 61173737 U | 10/1986 |
| JP | 11311125 A | 11/1999 |
| KR | 950009135 Y1 | 10/1995 |
| KR | 1020050103790 A | 11/2005 |

* cited by examiner

ACTUATOR SHAFT BOOT

FIELD OF THE INVENTION

Wastegated turbochargers all use actuators to manipulate the wastegate valve which controls turbine wheel bypass of exhaust gas energy. The diaphragms in these actuators are susceptible to damage from road materials, which enter the actuator canister through an actuator shaft bearing. This invention addresses the need for an improved shaft sealing design for turbocharger actuator.

BACKGROUND OF THE INVENTION

Turbochargers are a type of forced induction system. They deliver air, at greater density than would be possible in the normally aspirated configuration, to the engine intake, allowing more fuel to be combusted, thus boosting the engine's horsepower without significantly increasing engine weight. A smaller turbocharged engine, replacing a normally aspirated engine of a larger physical size, will reduce the mass and can reduce the aerodynamic frontal area of the vehicle.

Turbochargers use the exhaust flow from the engine exhaust manifold to drive a turbine wheel (21), which is located in the turbine housing (2). Once the exhaust gas has passed through the turbine wheel and the turbine wheel has extracted energy from the exhaust gas, the spent exhaust gas exits the turbine housing through the exducer and is ducted to the vehicle downpipe and usually to after-treatment devices such as catalytic converters, particulate traps, and $NO_x$ traps.

In a wastegated turbocharger, the turbine volute is fluidly connected to the turbine exducer by a bypass duct. Flow through the bypass duct is controlled by a wastegate valve. Because the inlet of the bypass duct is on the inlet side of the volute, which is upstream of the turbine wheel, and the outlet of the bypass duct is on the exducer side of the volute, which is downstream of the turbine wheel, flow through the bypass duct, when in the bypass mode, bypasses the turbine wheel, thus not powering the turbine wheel. To operate the wastegate, an actuating or control force must be transmitted from outside the turbine housing, through the turbine housing, to the wastegate valve inside the turbine housing. A wastegate pivot shaft extends through the turbine housing and rotates about its axis (64) when driven by an actuator (40). Outside the turbine housing the actuator (40) is connected to a wastegate arm (74) via a linkage (50, 51, 72), and the wastegate arm (74) is connected to the wastegate pivot shaft. Inside the turbine housing, the pivot shaft is connected to a wastegate valve. Actuating force from the actuator is translated into rotation of the pivot shaft, moving the wastegate valve inside of the turbine housing to bypass exhaust flow to the turbine wheel.

Turbine housings experience great temperature gradients and temperature flux. The outside of the turbine housing faces ambient air temperature while the volute surfaces contact exhaust gases ranging from 740° C. to 1050° C. depending on the fuel used in the engine. It is essential that the actuator, via the translated motions described above, be able to control the wastegate to thereby control flow to the turbine wheel in an accurate, repeatable, non-jamming manner. The proximity of a wastegate actuator to the turbine housing has multiple effects. Heat can conductively travel up the actuator shaft (50) to the actuator diaphragm (48). Heat from the turbine housing, to which most actuators are mounted, can be radiatively transferred not only to the actuator shaft and thence to the actuator diaphragm, but also to the actuator canister components such as: the base ring (46), the lower canister (44) and the upper canister (45). The latter components are sometimes protected from radiative heat transfer by incorporating an actuator heat shield (43) surrounding the affected components.

A variable geometry turbine (VTG) mechanism is used not only to control the flow of exhaust gas to the turbine wheel but also to control the turbine back pressure required to drive EGR exhaust gas, against a pressure gradient, into the compressor system to be re-admitted into the combustion chamber. An actuator is used to control the angle of a vane set within the turbine housing and that, in turn, controls the turbine power.

Regulated two stage turbocharger (R2S) configurations have multiple turbos configured such that a flap or valve on one turbine housing can alter the exhaust flow to the second turbine housing. Depending on the requirement, the turbine stages can either be in series, sequential or in a parallel configuration. R2S configurations can be used to control turbine flow and exhaust back pressure, to control EGR flow, or to control a large or a small turbo to suit engine requirements such as transient performance or steady state performance. The valve or flap is driven by an actuator. On R2S turbochargers there are also valves used to bypass compressor outflows to control the swallowing capacity of large and small compressor stages in the same system.

Turbochargers are located in the engine compartment, outside of the engine block and often (for example on in-line straight four or six cylinder engines) are located adjacent to the wheels. Some turbochargers, for example on twin turbo vee engines, are located very low in the engine compartment to keep the engines center of gravity as low as possible and to make the exhaust manifolds to the turbochargers as short as possible. As such, these turbochargers are subjected to road fluids such as water and mud, and materials from grit to anti-ice chemicals, all of which can penetrate the orifices in the turbocharger.

Pneumatic actuators operate by air pressure (which can be positive or negative, typically depending upon the source of the pressure) distending a diaphragm being resisted by a spring of known rate, often accompanied by atmospheric pressure on the spring side of the diaphragm. With respect to the actuator, the difference between a positive pressure and a negative pressure simply being the side of the diaphragm into which the pressure is supplied. The motion of the diaphragm (48) is transferred to the extension of a shaft (50), which then translates to rotation of a wastegate arm (62) mechanically or chemically attached to a wastegate pivot shaft which rotates, opening or closing the wastegate valve. A wastegate spring (47) resists the pressure exerted on the diaphragm and is used to return the shaft to its resting position (with the wastegate valve in the closed position).

For clarity of terms the following definitions have been adopted:
  True length of the actuator shaft assembly: the length from the foot of the shaft (50), where the shaft attaches to the upper cup (49) in the actuator, to the pivot center of the joint at the wastegate shaft end.
  Centerline of the wastegate arm: the line joining the axis of rotation of the wastegate pivot shaft and the center of the joint.
  Radius described by the wastegate arm: the length between the axis of rotation of the wastegate pivot shaft and the center of the joint (78).

Angle through which the wastegate arm rotates: assumed to be the angle between the wastegate valve being fully closed and fully open.

Effective length of the upper pivot arm of the wastegate actuator shaft: the length from the aforementioned joint of the shaft to the upper cup (49) to the guide bearing (53) about which the shaft pivots.

The effective lower pivot arm of the actuator shaft: the length from the guide bearing (53) to the center of the joint which attaches the actuator shaft to the wastegate arm (62).

It is assumed that: at the mid point of travel of the actuator shaft, the angle between the centerline of the wastegate arm and the centerline of the actuator shaft is 90°, thus minimizing the subtended angle described by the rotation of the wastegate arm.

The angle through which the actuator shaft rocks is determined by a number of relationships:

For a fixed true length of the actuator shaft assembly, the angle subtended by the radius described by the wastegate arm (from wastegate valve open to closed) is a function of the length (i.e., radius) between the axis (64) about which the wastegate arm rotates, and the pivot center (78) of the joint which attaches the wastegate arm to the actuator shaft assembly.

For a fixed true length of the radius described by the wastegate arm, the angle subtended by the wastegate arm is a function of the length of the actuator shaft.

Since the actuator (43) is mounted fixed to the turbine housing, while the joint between actuator shaft assembly and wastegate arm pivots about pivot center (78), the wastegate shaft assembly pivots about a bearing (53) attached within the lower canister (44). Since it becomes the pivot about which the shaft rocks within the canister, the axial position of the bearing (53) controls the radial position of the actuator piston (49) in response to a radial displacement of the wastegate arm, as determined by an axial displacement of the actuator shaft (50). The closer the axial position of the bearing to the piston, the greater the radial displacement of the piston (for a given wastegate arm rotation). In some actuators the radial position of the bearing (53) is modified by having the bearing's radial location partially controlled by a flexible member such as an "O" ring. This somewhat complicated arrangement minimizes the radial displacement of the diaphragm in an effort to increase the life of the diaphragm.

The actuator component critical to actuator life is the diaphragm. The diaphragm (48) is located in the upper canister shell (45) such that the outer rim of the diaphragm is captured by the joint of the lower canister (44) and the upper canister (45) to produce an airtight seal of the diaphragm and the upper canister shell.

As commanded by the engine control unit (ECU), air pressure is delivered to the actuator through the air fitting (52) to fill the void between the actuator (48) and the upper canister shell (45). The pressure of the incoming air to the actuator forces the diaphragm away from the at-rest position, resisted by the force exerted by a spring (47). The inflation of the void behind the diaphragm forces the diaphragm to compress the spring via displacement of a piston (49) to which is mechanically attached the actuator shaft (50) as described above, while at the same time compressing the space and increasing the pressure on the spring-side of the actuator, which may cause escape of air through a vent or a gap between the actuator shaft and the bearing (53). As the command pressure to the actuator is reduced, the spring forces a return of the piston, reducing pressure on the spring-side of the actuator, leading to a sucking in of ambient air through the bore in the bearing (53).

As described above, the actuator is typically close-coupled to one turbine housing, or a plurality of turbine housings. In order for the actuator to live at the temperatures associated with such proximity to thermal sources the diaphragm is constructed of a composite of fluorosilicone and Kevlar to provide acceptable life at temperature and duty cycle.

Any debris which enters the area in which the diaphragm contacts either the piston or the outer canister shells of the actuator will result in fretting of the diaphragm material which will ultimately lead to failure of the diaphragm and thus the actuator.

The life of a wastegate actuator is compromised by many facets of both design and location: The angle through which the actuator shaft is displaced, the temperature of the critical areas of the diaphragm, the duty cycle, the shape of the components in contact with the diaphragm, and the physical environment to which the actuator is subjected.

Thus it can be seen that there is a need for a protective cover for an actuator shaft to operate in the harsh environment and to accommodate the complex motions of wastegate and VTG actuators in turbochargers.

SUMMARY OF THE INVENTION

The present invention has been developed in view of the aforementioned problems. An objective of the invention is to provide a protective boot to inhibit the ingress of road associated chemicals and matter which could shorten the projected life of the actuator, specifically the diaphragm in the actuator.

BRIEF DESCRIPTION OF THE DRAWINGS

The present invention is illustrated by way of example and not limitation in the accompanying drawings in which like reference numbers indicate similar parts, and in which:

FIGS. 4A, B depict the motion of the actuator shaft and attachments;

FIGS. 6A, B depict the small end axially constraining projection and groove, with air passage groove;

FIGS. 7A, B depict views showing the holder;

DETAILED DESCRIPTION OF THE INVENTION

As explained above, the motion through which an actuator shaft assembly moves both axially and radially is not a simple motion. In general the length, stroke and radial displacement of the wastegate end of the actuator shaft assembly is compromised to provide acceptable diaphragm life. Typically there is no seal between the sliding motion of the actuator shaft (50) and the bearing (53), so road materials, which are detrimental to the life of the diaphragm, are allowed to enter the actuator canister and ultimately damage the diaphragm.

The inventor sought to improve the life of the diaphragm, and thus the actuator, by providing a cost effective sealing device to prevent the ingestion of road fluids and solids into the actuator, and more specifically, a sealing device which could handle the complicated axial and radial motion described by the shaft as the shaft moves a control arm, which rotates about its centerline (64), and forces the actuator shaft to rock radially as it is displaced axially. Many different kinds of seals were considered and tested but ultimately failed to deliver the service life required.

The inventor finally solved the difficult problem by designing a bellows type seal which attaches on the actuator shaft on one end and to a holder on the actuator on the other end. The design of a plurality of convolutes in the bellows ensures that any plunge or extension of the actuator shaft results only in relatively linear extension or contraction of the bellows, rather than the bellows collapsing and touching the shaft. The invention includes a novel method for attachment and a novel method for the addition or subtraction of the bellows seal to or from the actuator. The invention also allows for air aspiration to and from the interior of the bellows with the exclusion of fluid aspiration into the bellows.

Figure 1:
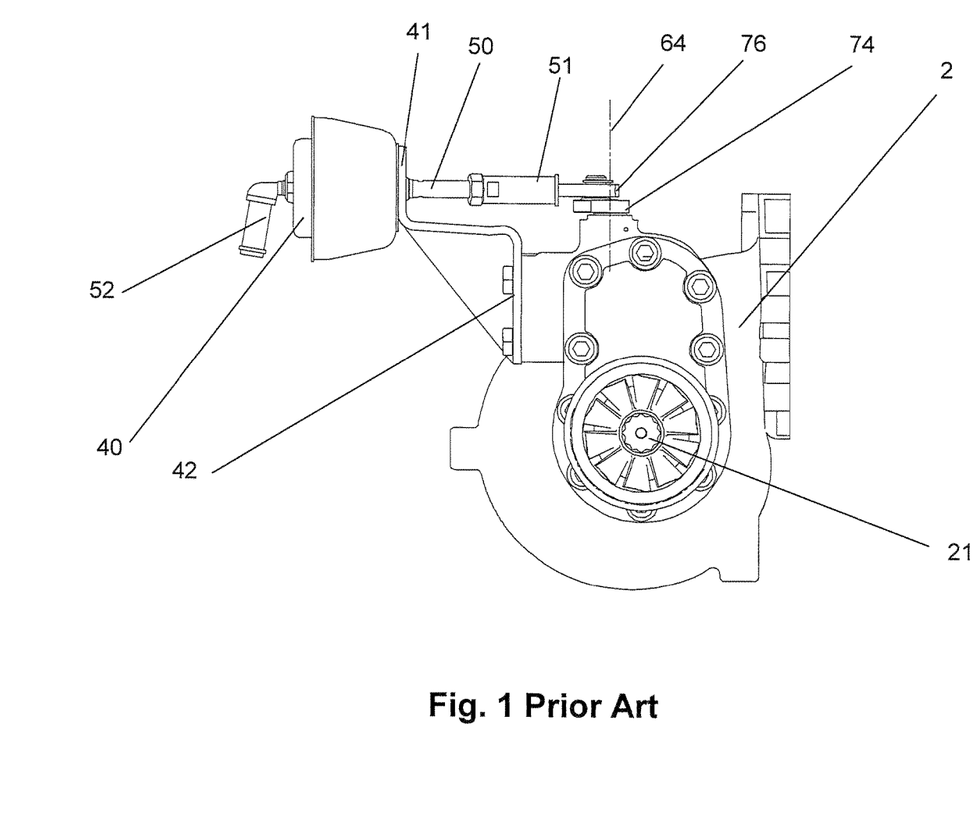
FIG. 1 depicts a the section for a typical wastegated turbocharger.
Figure 2:
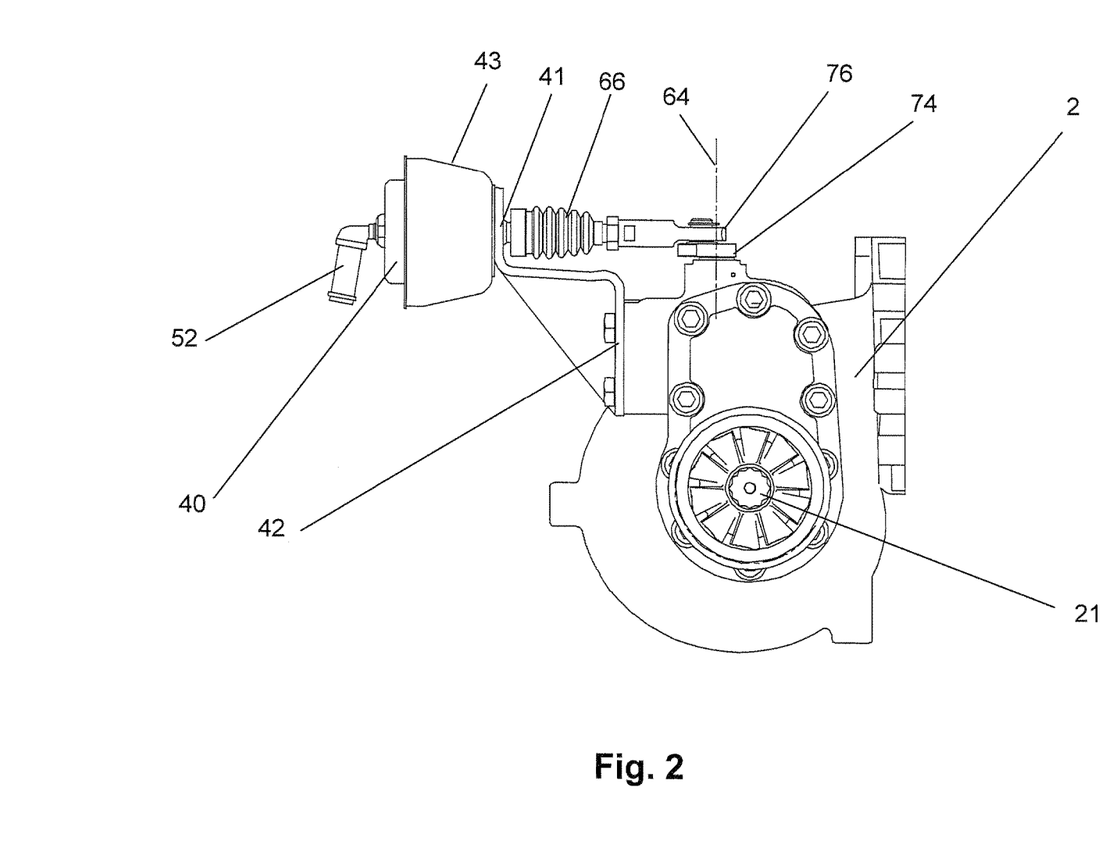
FIG. 2 depicts a section of the inventive wastegated turbocharger.
Figure 3:
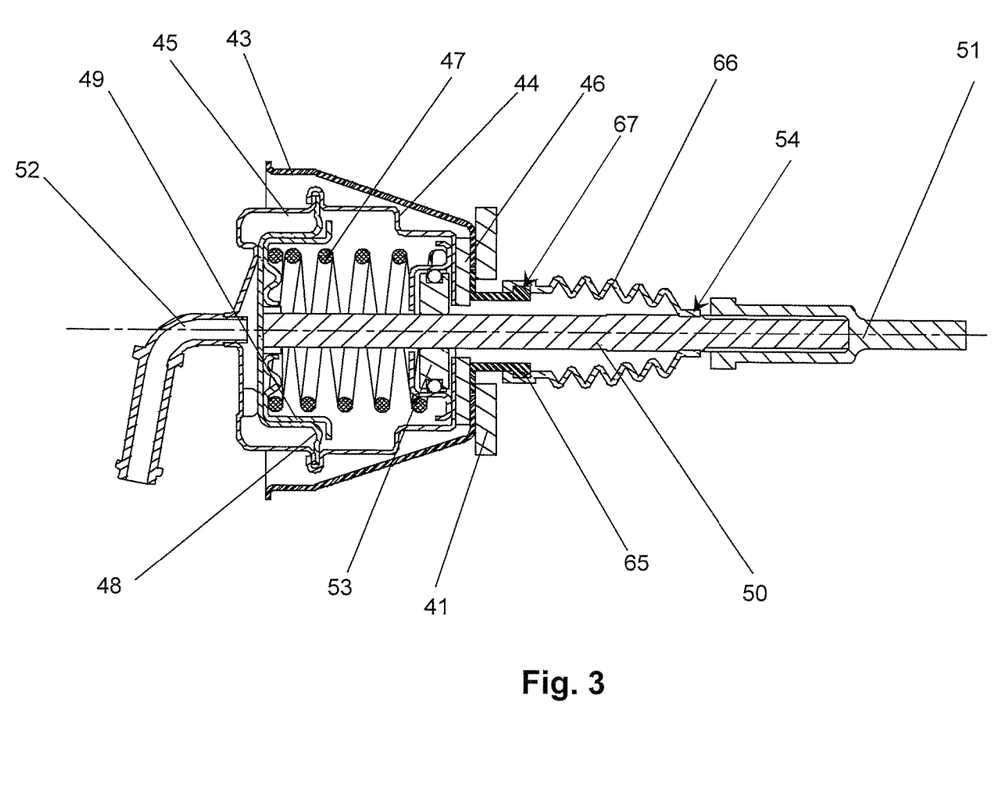
FIG. 3 depicts a section view of an actuator with the inventive boot.
Figures 4A, 4B:
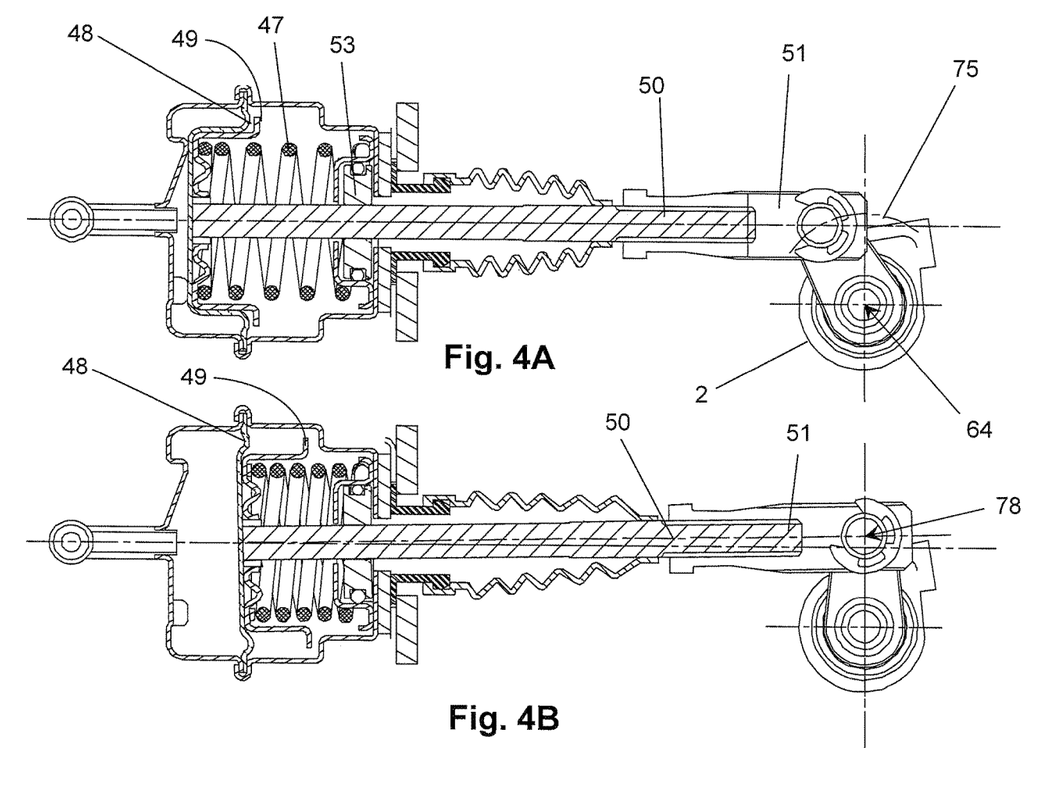
Figure 5A:
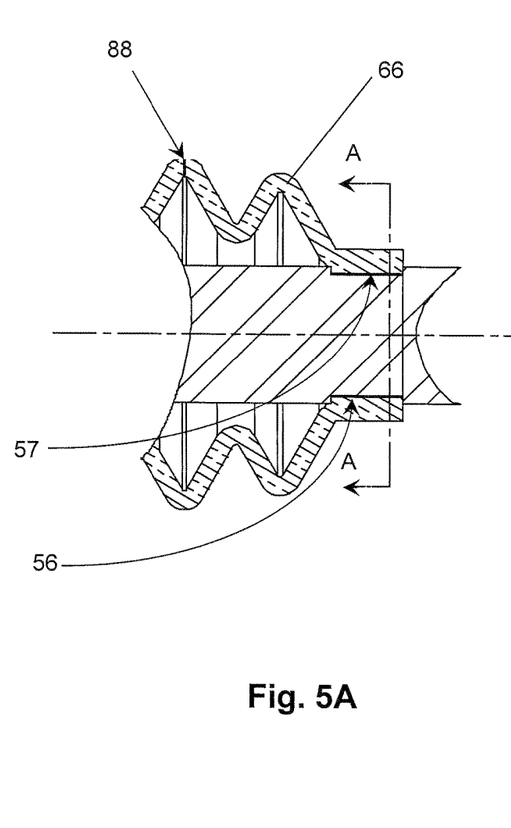
FIGS. 5A, B depict the small end axially constraining projection and groove.
Figure 5B:
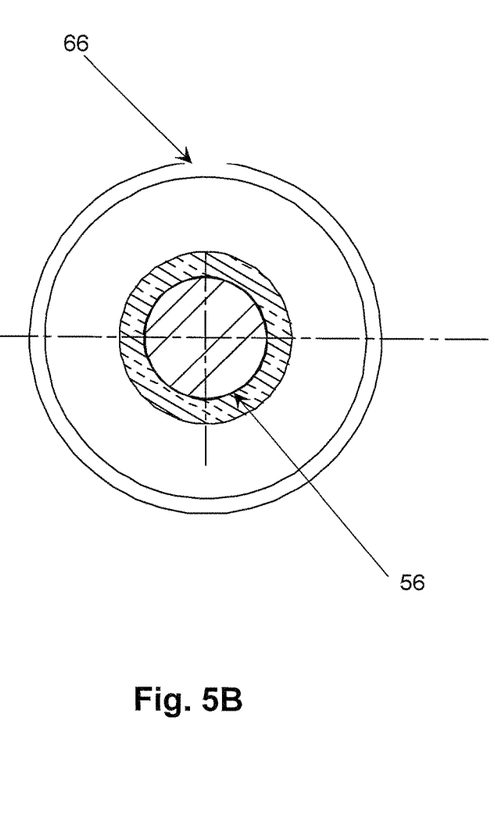
Figures 6A, 6B:
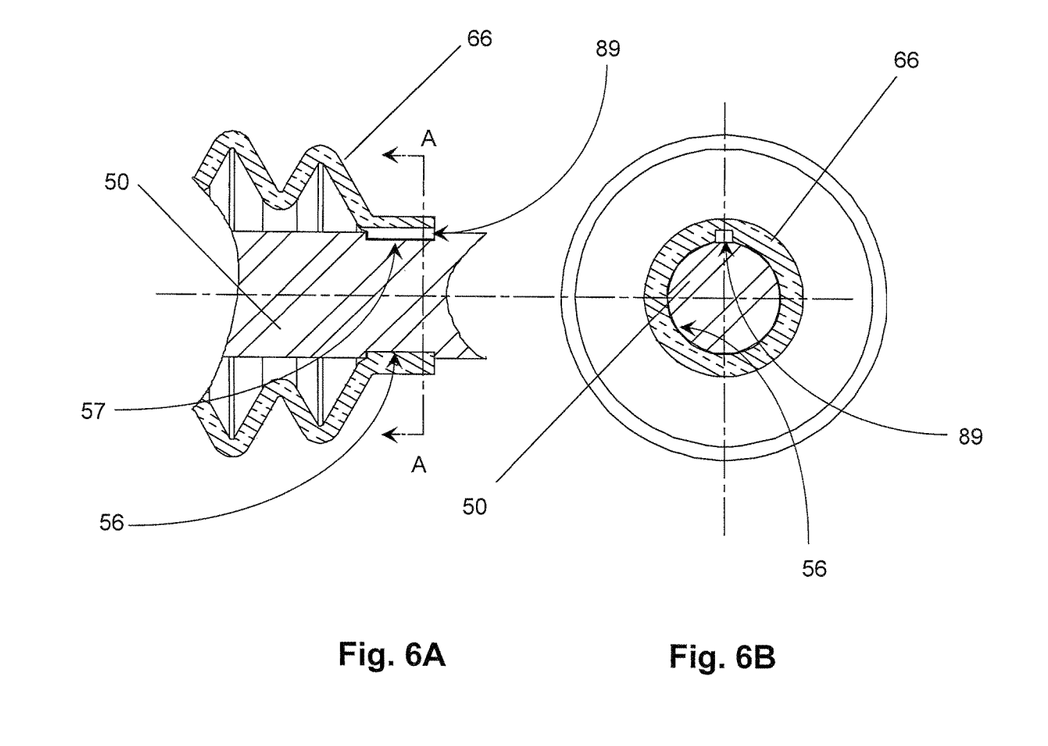
Figures 7A, 7B:
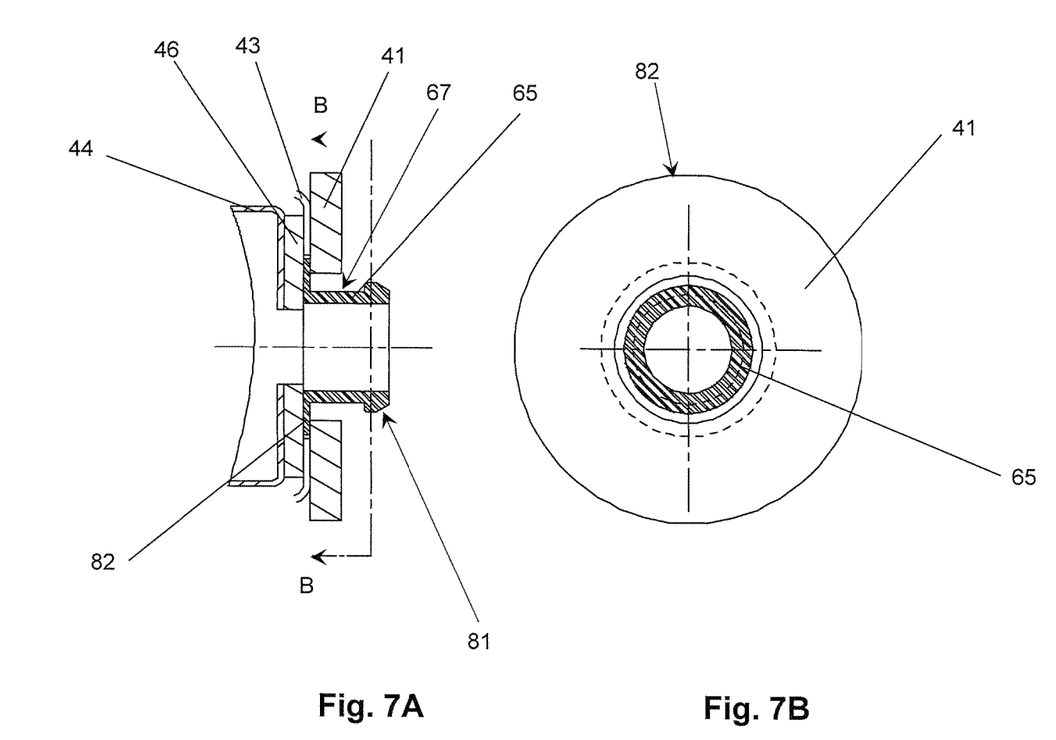

In a first embodiment of the invention, a bellows (66) is added to the actuator. The bellows has a large end, on the actuator side, and a small end, on the wastegate side. The small end is sealed and attached, radially and axially, to the actuator shaft (50) by a narrowing or projection (55) in the bellows which fits into a complementary groove (54) in the shaft (50). As depicted in FIGS. 6A and 6B, the inner generally cylindrical surface (56) of the projection (55) in the small end of the bellows seals radially against an outer generally cylindrical surface of the groove fabricated into the shaft (50). For assembly, this design allows for the small end of the bellows to slide over the outside diameter of the shaft until the projection (55) drops into the groove (54) thus axially locating the small end of the bellows and providing a circumferential seal of the bellows to the shaft.

On the large end of the bellows there is a like arrangement. In one mode of the invention, the bellows (66) has a projection (68) in the inside surface of the large end of the bellows which fits over a complementary groove (67) in the holder (65). To assemble the large end of the bellows to the holder (65) the opening in the large end of the bellows is slid up a chamfer (81) on the wastegate side of the end of the holder and into the groove or recess (67) in the holder to axially constrain the large end of the bellows and circumferentially seal the bolder to the bellows. With this design no additional clamps are required to seal and constrain the bellows to the shaft and actuator.

The holder (65) is designed as a separate piece so that it can be assembled to the actuator when the actuator is assembled to the bracket, or omitted from the actuator. The reason for this is that some applications may not require the bellows (and holder) so the inventors sought to have a design in which the bellows and holder can be added or left out of the assembly. To enable this part count reduction, the flange (82) of the holder (65) is designed so that the approximate thickness of the holder flange is equal to the approximate thickness of the heat shield (43). Since the heat shield is sandwiched between the base ring (46) of the actuator and the top flange (41) of the actuator bracket (42), adding the holder is simply done by inserting the flange (82) of the holder (65) between the actuator and the top flange (41) of the actuator bracket (42) as the actuator is assembled to the bracket. The concentricity of the holder to the actuator centerline is achieved by the outside diameter of the holder fitting inside the hole in the base of the actuator heat shield (43). The concentricity of the holder to the actuator centerline could also be managed by a pilot diameter on the actuator base ring.

In a variation to the first embodiment of the invention, in the case where the flange (82) of the holder has a greater thickness than that of the heat shield, or where there is no requirement for a heat shield, a pilot can be fabricated into either the base ring (46) of the canister, or the top flange (41) of the actuator bracket, to allow axial and radial alignment and fitting of the bellows holder (65).

It was a requirement of the inventors that the bellows should axially contract and expand approximately following the shaft, while not collapsing, in order to provide a bellows life equal to, or greater than, the life of the turbocharger. To meet this requirement, the inventor designed the bellows to have a larger diameter parallel (i.e., generally cylindrical, that is, same wave heights) convolute section transitioning a smaller diameter generally conical convolute section (i.e., decreasing wave height). In the illustrated embodiment, the bellows is designed to fit an actuator shaft of approximately 8 mm diameter with a plunge depth (i.e., length change) of from 9 mm to 33 mm.

Figure 8:
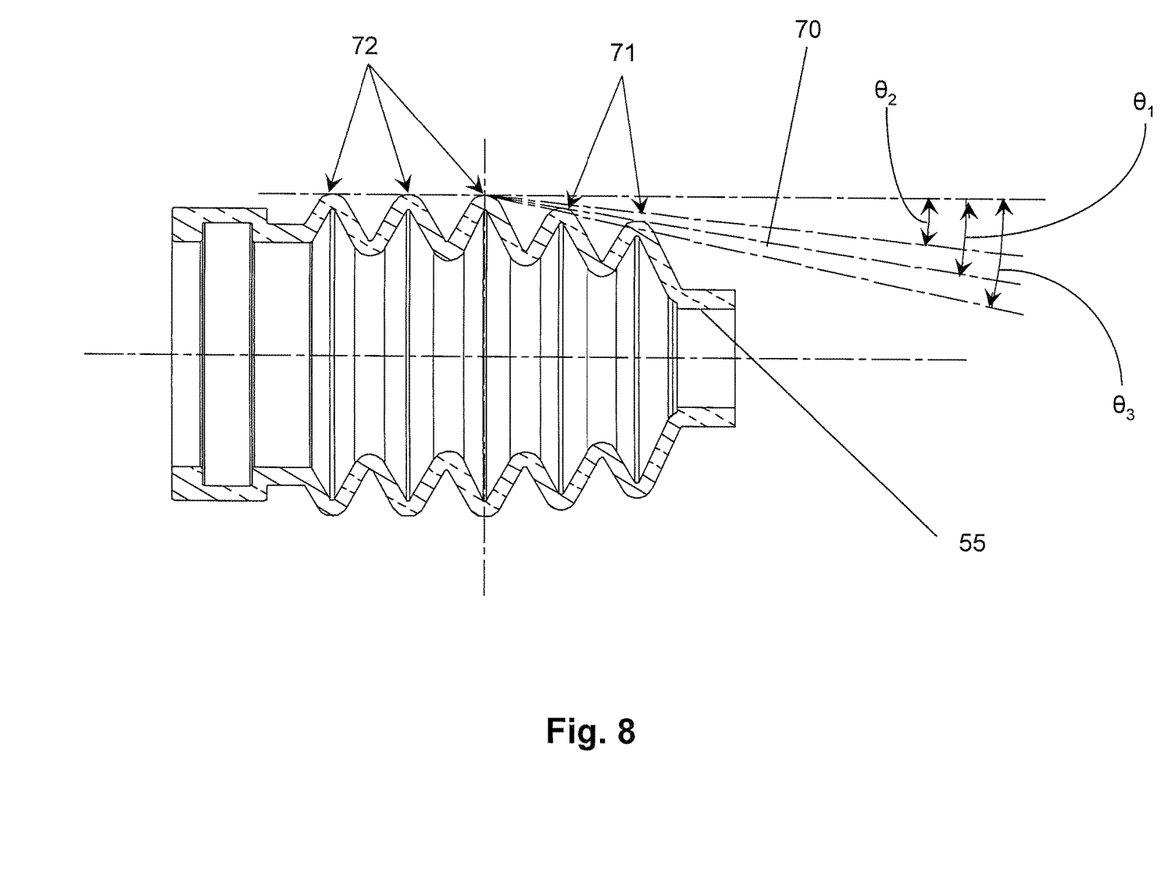
FIG. 8 depicts a section view of the boot construction.
Figure 9:
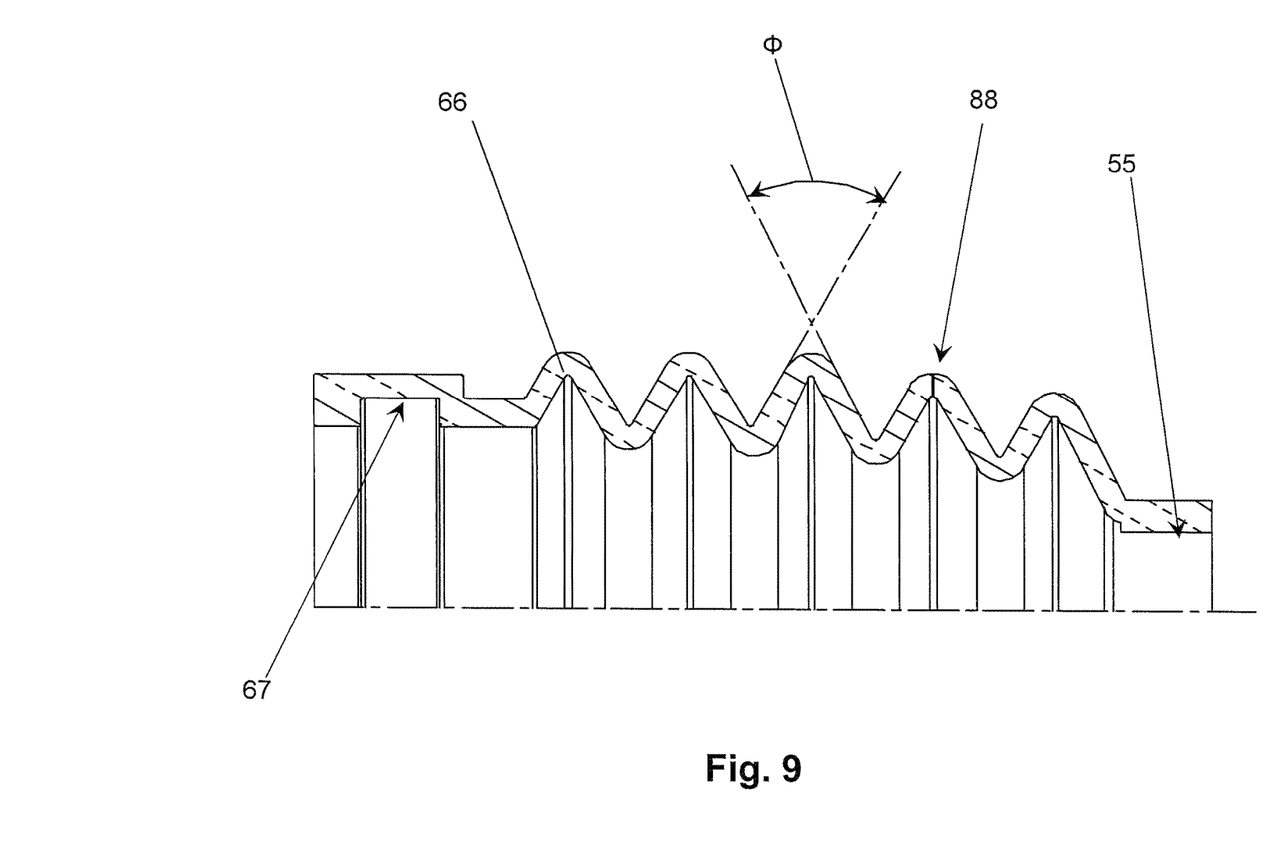
FIG. 9 depicts a section view of the convolute construction.

As depicted in FIGS. 8 and 9, each convolute has an inner surface and an outer surface separated by approximately 7 mm. Testing by the inventors showed that material with a wall greater than 7 mm actually caused a reduction in bellows life. Each wave or convolute (72) for the larger diameter parallel section is defined as having a maximum outer diameter of approximately 19 to 20 mm, resulting in an inner diameter (at the maximum diameter of the convolute of approximately 12 mm to 13 mm. The maximum diameters of the convolutes (71) in the generally conical section ($\theta_1$), fit between two cones. The outer cone ($\theta_2$), having a half angle of 6° and the inner cone ($\theta_3$) having a half angle of 12°. The conical angles ($\Phi_{1,2,3}$) are measured approximately at rest.

In one particularly preferred embodiment, the conical line is actually a $2^{nd}$ order logarithmic curve.

The angles ($\Phi$) of the outer surface of the convolute are measured at rest and are approximately 60°, as depicted in FIG. 9.

Because the volume of air inside the bellows is changing with the change in length of the bellows, it is necessary for the pressure of air inside the bellows to be aspirated both in and out of the bellows. In providing an air aspiration passageway the internal components of the actuator are opened to ingress of fluids and road solids which can be detrimental to the life of the actuator. To minimize this potential problems the design and placement of said passageway is important. To perform this task the inventor determined that the best way to perform this function was to produce a small aspiration hole (88).

In the first embodiment of the invention, as depicted in FIG. 9, the air aspiration hole (88) is at the peak of the second from last convolute, in the direction of the small end of the bellows. The stresses on the material surrounding the air aspiration hole can be quite large since the position of the hole is in a zone of flexing, so the hole must be carefully formed to minimize the tendency for the bellows to have a stress riser which could lead to tearing of the bellows material. While the stress levels surrounding the hole may be high, the position of the hole is such that it minimizes the ingress of fluids and solids.

In a variation to the position of the air aspiration hole of the first embodiment of the invention, as depicted in FIGS. 6A and 6B, the air aspiration path is a groove (89) formed into the projection (57) which provides axial constraint for the small end of the bellows. In this variation, the passageway is in an area of relatively low stress but the potential for ingress of fluids or solids, which may travel down the shaft, into the internal part of the actuator is higher.

In another alternative, a dedicated vent could be provided between the spring side of the actuator canister and the bellows, or the gap between the shaft (50) and bushing (53) could be provided with sufficient play, such that as command air pressure is delivered to the actuator through the air fitting (52) to fill the void between the diaphragm (48) and the upper canister shell (45), the pressure of the incoming air to the actuator forces the diaphragm away from the at-rest position and extends the actuator shaft, simultaneously (a) reducing the volume and thus increasing pressure on the spring-side of the actuator canister and (b) expanding the bellows thus decreasing pressure in the bellows. The effect of a vent between these two spaces (spring-side of actuator canister and bellows) could allow pressure equalization without the need to draw in dirty ambient air.

As illustrated, the actuator is pneumatic driven, but the actuator could just as well be electrically or hydraulically driven.

The invention claimed is:

1. A turbocharger, comprising
a turbine wheel (21) in a turbine housing (2),
a device within the turbine housing,
an actuator (40) located outside the turbocharger for actuating the device within the turbine housing, the actuator including an actuator housing, an actuator diaphragm (48) dividing the actuator housing into an upper canister (45) and a lower canister (44), and an actuator shaft (50) having an actuator shaft first end and an actuator shaft second end, said shaft first end connected to the actuator diaphragm (48), said shaft extending from said housing and moveable between an extended position and a retracted position relative to the actuator housing, said actuator shaft second end operatively connected to said device within the turbine housing for actuation of said device, and
a bellows seal (66) having a larger diameter end sealingly attached to the actuator housing and a smaller diameter end sealingly attached to the actuator shaft (50), wherein said bellows seal axially has a convoluted structure with a convoluted generally cylindrical section formed by a plurality of convolutes having the same maximum outer diameter on the larger diameter end and a convoluted generally conical section formed by a plurality of convolutes having decreasing maximum outer diameter on the smaller diameter end.

2. The turbocharger as in claim 1, wherein the smaller diameter end of the bellows includes a circumferential projection (55) which fits into a complementary groove (54) in the shaft (50), or vice-versa.

3. The turbocharger as in claim 1, wherein the larger diameter end of the bellows (66) is provided with a circumferential inward projection (68), wherein the actuator housing is provided with a holder (65) with a groove (67) complementary to the inward projection (68), and wherein the circumferential projection (68) in the inside surface of the bellows (66) is seated in the groove (67) in the holder (65), or vice-versa.

4. The turbocharger as in claim 3, wherein said holder (65) is a removable part.

5. The turbocharger as in claim 1, further comprising a clamp for securing the bellows seal (66) to the actuator housing or actuator shaft.

6. The turbocharger as in claim 1, wherein the angle ($\Phi$) of the outer surface of each convolute measured at rest is from 50° to 70°.

7. The turbocharger as in claim 1, further comprising an aspiration hole (88) in the bellows.

8. The turbocharger as in claim 1, wherein the actuator housing has a spring-side and a pneumatic pressure control side, and wherein the actuator housing is designed to allow aspiration between the spring-side of the actuator housing and the inside of the bellows.

9. The turbocharger as in claim 1, wherein the actuator is a pneumatic actuator.

10. The turbocharger as in claim 1, wherein the device within the turbine housing is a wastegate.

11. A turbocharger as in claim 1, wherein the device within the turbine housing is a variable turbine geometry (VTG) mechanism.

12. A turbocharger, comprising
a turbine wheel (21) in a turbine housing (2),
a device within the turbine housing,
an actuator (40) located outside the turbocharger for actuating the device within the turbine housing, the actuator including an actuator housing, an actuator diaphragm (48) dividing the actuator housing into an upper canister (45) and a lower canister (44), and an actuator shaft (50) having an actuator shaft first end and an actuator shaft second end, said shaft first end connected to the actuator diaphragm (48), said shaft extending from said housing and moveable between an extended position and a retracted position relative to the actuator housing, said actuator shaft second end operatively connected to said device within the turbine housing for actuation of said device, and
a bellows seal (66) having a larger diameter end sealingly attached to the actuator housing and a smaller diameter end sealingly attached to the actuator shaft (50), wherein said bellows seal axially has a convoluted structure with a convoluted generally cylindrical section formed by a plurality of convolutes having the same maximum outer diameter on the larger diameter end and a convoluted generally conical section formed by a plurality of convolutes having decreasing maximum outer diameter on the smaller diameter end, wherein the convoluted structure has a wall thickness of from 6.5 to 7.5 mm.

13. A turbocharger, comprising
a turbine wheel (21) in a turbine housing (2),
a device within the turbine housing,
an actuator (40) located outside the turbocharger for actuating the device within the turbine housing, the actuator including an actuator housing, an actuator diaphragm (48) dividing the actuator housing into an upper canister (45) and a lower canister (44), and an actuator shaft (50) having an actuator shaft first end and an actuator shaft second end, said shaft first end connected to the actuator diaphragm (48), said shaft extending from said housing and moveable between an extended position and a retracted position relative to the actuator housing, said actuator shaft second end operatively connected to said device within the turbine housing for actuation of said device, and
a bellows seal (66) having a larger diameter end sealingly attached to the actuator housing and a smaller diameter end sealingly attached to the actuator shaft (50), wherein said bellows seal axially has a convoluted structure with a convoluted generally cylindrical section formed by a plurality of convolutes having the same maximum outer diameter on the larger diameter end and a convoluted generally conical section formed by a plurality of convolutes having decreasing maximum outer diameter on the smaller diameter end, wherein the maximum diameters of the convolutes (71) in the generally conical section ($\theta_1$), fit between two cones, wherein the outer cone ($\theta_2$) has a half angle of 6° and the inner cone ($\theta_3$) has a half angle of 12° measured when the shaft is in the retracted position.

\* \* \* \* \*